Patented Nov. 27, 1945

2,389,781

UNITED STATES PATENT OFFICE 2,389,781

LUMINESCENT COATING MATERIAL

Sampson Isenberg, Chicago, Ill., assignor to General Luminescent Corporation, Chicago, Ill., a corporation of Illinois No Drawing. Application June 22, 1942,
Serial No. 447,932

15 Claims. (Cl. 252—301.3)

My invention relates to surface covering preparations using luminescent materials. It relates more in particular to paint and paint-like preparations employing luminescent materials as pigments, and is concerned with a method for preventing darkening of such pigments.

Certain types of luminescent materials are light sensitive, particularly in the presence of moisture. When such luminescent materials are incorporated in usual paint vehicles and the resulting paint applied to a surface by any usual procedure such as brushing, spraying, screening, printing and the like, the surface frequently becomes discolored and blackened if exposed to sunlight for only a relatively short period of time, particularly if moisture be present. Not only is the daylight character of the pigment affected adversely but the luminescent power of the pigment may be destroyed substantially in its entirety. While various types of luminescent materials may be so affected, the more important ones with which this difficulty occurs are the sulphides, particularly zinc sulphide, cadmium sulphide and mixed zinc cadmium sulphide wherein the ratio of zinc to cadmium may vary from 1 to 10,000 to 10,000 to 1, depending upon the color of the material desired. Such sulphides may be activated with various substances such as copper, bismuth, manganese, nickel, and the like, the latter, in addition to being an activator, having the function sometimes of decreasing phosphorescence or after-glow.

Luminescent materials of the sulphide type have been used, for example, on the dials of airplane instruments, the desired effect being that the paint-like material comprising the luminescent material has the same general daylight color as the luminescent color at night when the surface is subjected to ultra violet radiation. One way of applying luminescent sulphide material for this purpose is in the form of a paint, and for convenience I shall first direct my attention to this type of vehicle. Paint pigments are generally ground to quite finely divided form and incorporated in a binder to give the proper consistency and proper drying characteristics. The binder used, when the pigments are luminescent, is one which will admit sufficient ultra violet light through the binder to the pigment to permit activation thereof. Paints of the type identified, when applied to a surface, frequently blacken very quickly and become worthless as light emitters. I have found, for example, that if a zinc cadmium sulphide pigment be incorporated in a high grade methyl methacrylate resin and exposed to a sunlight lamp in a moist atmosphere under controlled test conditions, the life of the pigment will be forty minutes and this notwithstanding the fact that methyl methacrylate resin is considered to have considerable value in protecting surfaces and objects from atmosphere and, moreover, is and has been considered a very desirable vehicle for use with luminescent pigments.

I have found that, under the same test conditions, a surface comprising the same luminescent material produced and applied in accordance with my invention, and which is at least as brilliant as the control sample when first produced, will remain in good condition for more than 80 hours under the same accelerated test conditions. A useful life 125 times as long is readily obtained for the luminescent materials when the paint or paint-like bodies are produced in accordance with my invention and I believe, from the results obtained, that the useful life of a coating produced in accordance with my invention may be still further and markedly increased.

In accordance with the general features of my invention, I utilize, with the luminescent pigment and vehicle, including a binder, a partial ester of a relatively high molecular weight carboxylic acid and a polyhydric oxy substance. Among the materials which I have found particularly satisfactory in the practice of my invention are the aliphatic carboxylic acid esters of polyhydric alcohols, particularly the mono ricinoleic acid ester of glycerin. Suitably employed, this particular partial ester is very efficacious for my purpose. I have also found that when certain resins, particularly the alkyd resins, are employed as binders, the effect of the partial ester in preventing or retarding the deleterious effect of light and light and moisture on the luminescent materials is greatly enhanced. I have found, also, that, in general, the coating applied by the use of my invention remains somewhat soft for relatively long periods of time, and to protect the surface I utilize a thin coating of a resin, all as will be hereinafter pointed out in greater detail. I have found that the protective coating referred to appears to have considerable advantage also in increasing the useful life of the coating and retarding the effect of the sunlight and moisture.

In accordance with one example, I produce a paint adapted for application to a surface by brushing in the following manner: 16 parts of zinc cadmium sulphide activated with copper and previously ground to 200 mesh are mixed with 1.6 parts of glycerin mono-ricinoleate and 1.6 parts of a thinner which is compatible with both the glycerol mono-ricinoleate and an alkyd resin subsequently employed as a binder. This mixture is introduced into a ball mill and the ball mill operated for four hours to thoroughly coat all of the particles of zinc cadmium sulphide with the glycerol mono-ricinoleate. To the ground mixture is then added 28 parts by weight of an alkyd resin solution, the alkyd resin solution comprising 50% solid alkyd resins and 50% thinner. The thinner is a conventional type of commercial thinner, usually a mixture, but it may be, for example, one of the following: toluene, xylene, "naphtha distillates," butyl acetate, amyl acetate, "mineral spirits" and the like. This resulting mixture is then ground in a ball mill for about one hour and is ready for use. It is applied with a brush to surfaces on which it is to be used. The applied coating is allowed to dry for a suitable time, e. g., about 24 hours, and a protective coating of an acrylic acid resin is applied thereto. The coating is applied by dissolving acrylic acid resin in a solvent and applying the resulting solution by means of a spray or brush. The resin employed for this protective coating should be one which is compatible with the binder employed for the paint and one which will not block out ultra violet light. Nitrocellulose alone, in general, is not satisfactory but resins such as the alkyd, "glyptal," methyl methacrylate, and like resins may be employed. Certain types of naturally occurring resins may, also, be used. The coating produced in accordance with the above example remained in good condition in excess of 90 hours during the accelerated test referred to hereinabove.

Another example of a method of practicing the invention is to mix together 10 parts of luminescent zinc cadmium sulphide and 2 parts of a mixture of the lauric acid mono ester of diethylene glycol and a thinner. This material is ground for 6 hours and into the ground mixture is introduced 17 parts of an alkyd resin solution containing approximately 50% solids. This latter mixture is then ground for one hour and is applied by brush. After allowing to stand for 12 hours, it is treated with a protective coating of methyl methacrylate. When exposed to the accelerated test referred to hereinabove, this coating remained in excellent condition for in excess of 50 hours.

My invention may be employed with other types of coatings such as those applied by spraying. It has been found very effective when coatings have been applied by means of the so-called silk screening method. These products differ from the product applied by the brushing method principally in being of a different consistency. I have employed the features of my invention to advantage, moreover, when the luminescent pigment is applied by a printing and dusting procedure. In this method the binder or vehicle is applied to a surface by a printing operation and the luminescent material in a generally dry condition is dusted onto the said surface and caused to adhere to the printed area thereof. Employing this technique, I first coat the particles of luminescent material with the partial ester by ball milling with a liquid such as a thinner, dry the ground mixture and then sieve it to produce a powder which for practical purposes is substantially dry. The proportion of partial ester employed and the character thereof are such as to promote the production of a substantially dry powder suitable for dusting.

In general, the amount of partial ester employed in the practice of my invention may suitably comprise approximately 10% by weight based upon the weight of the pigment. The size of the pigment particles, however, has an important bearing upon the proportion of partial ester used, enough being employed to coat the surface of the luminescent pigment. In general, the amount employed with usual pigments should be at least of the order of 3%, and, while there is no upper limit to the amount of partial ester employed except a practical one, in general, the partial ester should not be more than 15 to 20% by weight based upon the weight of the pigment.

In the production of the paint or paint-like material utilizing the features of my invention, the luminescent pigment preferably is ground with the partial ester first so as to obtain substantially an intimate mixture of these two materials and a coating of the pigment particles with the partial ester. Fairly satisfactory results can be obtained however by employing another order of steps and, if desired, all of the ingredients may be incorporated in a ball mill and ground together. Generally speaking, greater grinding time will be required if this method is used.

The vehicle employed for the pigment can be any suitable material. Thus it may be of the lacquer type employing a cellulose derivative or of the paint type employing a drying oil. The vehicle should be of such a character, however, that, in the final product, the substance binding the pigment together will pass at least enough ultra violet light to cause luminescence of the pigment particles. Preferably, however, I prefer a resin, optionally a synthetic weather-resisting resin and preferably an alkyd type of resin which I have found particularly efficacious when employed in combination with the partial ester. The combination of glycerol-mono-ricinoleate and an alkyd resin is particularly satisfactory. By the term "alkyd resins" I mean to include all weather-resisting resinous substances produced by the condensation of polyhydric alcohols and poly-basic acids and specifically the condensation product of glycerin and phthalic acid.

Hereinabove, in the specific examples given, I have referred to two specific partial esters which have been employed with good results in the practice of my invention. It must not be assumed, however, that other partial esters of relatively high molecular weight carboxylic acids and polyhydroxy substances cannot also be used with considerable advantage over the prior art. In general, any relatively high molecular weight carboxylic acid containing at least six carbon atoms may be employed to partially esterify a polyhydroxy substance and the resulting partial ester may be used in the practice of my invention. Examples of acids that may be employed in the production of such esters for my invention are straight chain and branched chain, saturated and unsaturated, carboxylic, aliphatic (including cycloaliphatic), fatty, aromatic, hydroaromatic, and araliphatic acids including caproic acid, caprylic acid, pelargonic acid, capric acid, sebacic acid, behenic acid, arachidic acid, cerotic acid, enanthic acid, erucic acid, melissic acid stearic acid, oleic acid, ricinoleic acid, ricinelaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completed hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acyloxy carboxylic acids such as $C_{17}H_{35}-CO-O-CH_2-COOH$; acids such as l-hydroxy stearic acid, dihydroxypalmitic acid, di-hydroxystearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydroaromatic acids such as hexahydrobenzoic acid, naphthenic acid and abietic acid; araliphatic and aromatic acids such as phthalic acid, benzoic acid, Twitchell fatty acids, naphthoic acid, pyridine carboxylic acid; hydroxy aromatic acids such as salicylic acid, hydroxy benzoic and naphthoic acids, and the like. It will be understood that mixtures of any two or more of said acids may be employed if desired and it will also be appreciated that said acids may contain substituent groups such as sulphate, sulphonic, nitrile, cyanogen, carbonyl, amide, amine, halogen, ketone and other groups. The acids may be employed as such or in the form of their anhydrides, esters including mono-, di-, tri-glycerides and the like, and acyl halides, or, in general, in the form of any of their acylating compounds. Of particular utility are the unsubstituted aliphatic acids containing from twelve to eighteen carbon atoms and their acyl halides.

The aliphatic polyhydroxy substances used in the preparation of the compounds described herein may be selected from a large class and include, among those mentioned, glycerol; glycols such as ethylene glycol, propylene glycol, trimethylene glycol, butylene glycol and the like; polyglycols such as diethylene glycol, triethylene glycol and tetraethylene glycol; pentaerythritol; quercitol; di-hydroxy acetone; triethanolamine; tripropanolamine; polyglycerols such as diglycerol, triglycerol, tetraglycerol and the like including mixtures thereof; carbohydrates and sugars including mono-, di- and polysaccharides such as dextrose, sucrose, xylose, arabinose, galactose, fructose, maltose, mannose, dextrin, starch, and the like; the natural and synthetic simple and complex glucosides; sugar alcohols such as arabitol, mannitol, mannitan, sorbitol, sorbitan, and dulcitol; and polyhydroxy-carboxylic acids such as tartaric acid, mucic acid, saccharic acid, gluconic acid, glucuronic acid, gulonic acid, mannonic acid, trihydroxy-glutaric acid, glyceric acid, carboxylic oxidation products of polyglycerols, others of similar character, and hydroxyethyl and hydroxypropyl ether derivatives of the above, as, for example:

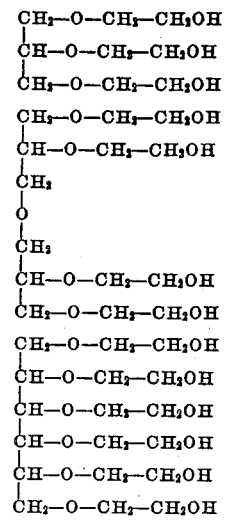

(For convenience, all hydroxyl groups are written facing one way.)

I shall not identify particular compounds beyond those already mentioned, but any partial esters produced employing the starting materials set out hereinabove may be employed to advantage particularly with synthetic resinous vehicles and preferably with the alkyd resins. I wish to repeat, however, that the partial ester of ricinoleic acid and glycerin has been found to be exceptionally satisfactory, and this particular partial ester in combination with a resin comprising the condensation product of glycerin and phthalic anhydride has been found commercially to be very satisfactory.

In the preceding description, I have referred in several places to the application of the invention to a coating material adapted to be applied in the form of a paint either by brushing or spraying and have indicated that my invention may be utilized with coatings applied in other ways. I know of no common expression to identify a material adapted to be used as an ink and a material adapted to be used as a paint to be applied with a brush, so for convenience in defining the invention in the claims, I have employed the broad expression "coating material." The meaning and significance of this expression when used in the claims is believed to be clear. Other terms, such as "resin," are used according to their ordinary meanings in both the specification and claims except where the context indicates otherwise. I employ the term "solvent," however, broadly in the claims to identify either a single solvent or mixtures of solvents functioning as a so-called "thinner." My invention, of course, is not particularly concerned with the type of solvents used.

The features and scope of my invention are defined in the claims.

What I claim as new and desire to protect by Letters Patent of the United States is:

1. A luminescent coating material comprising a vehicle, a luminescent pigment and a partial ester of a mono-carboxylic acid containing at least 6 carbon atoms and a polyhydroxy substance, said luminescent pigment being of a type affected adversely by moisture and light, said partial ester functioning to retard the adverse effect of moisture and light on the luminescent pigment.

2. A luminescent coating material comprising a vehicle, a luminescent pigment and a partial ester of an aliphatic mono-carboxylic acid containing at least 6 carbon atoms and a polyhydric alcohol, said luminescent pigment being of a type affected adversely by moisture and light, said partial ester functioning to retard the adverse effect of moisture and light on the luminescent pigment.

3. A luminescent coating material comprising a resin, a solvent therefor, a luminescent pigment and a partial ester of a mono-carboxylic acid containing at least 6 carbon atoms and a polyhydroxy substance, said luminescent pigment being of a type adversely affected by moisture and light and the partial ester functioning to retard the adverse effect of moisture and light on the said luminescent pigment.

4. A luminescent coating material comprising an alkyd resin, a solvent therefor, a luminescent pigment and a partial ester of a mono-carboxylic acid containing at least 6 carbon atoms and a polyhydroxy substance, said luminescent pigment being of a type adversely affected by moisture and light and the partial ester functioning to retard the adverse effect of moisture and light on the said luminescent pigment.

5. A luminescent coating material comprising a resin, a solvent therefor, a luminescent pigment and a partial ester of glycerin and an aliphatic mono-carboxylic acid containing at least 6 carbon atoms, said luminescent pigment being of a type adversely affected by moisture and light and the partial ester functioning to retard the adverse effect of moisture and light on the said luminescent pigment.

6. A luminescent coating material comprising a resin, a solvent therefor, a luminescent pigment and a partial ester of glycerin and ricinoleic acid, said luminescent pigment being of a type adversely affected by moisture and light and the partial ester functioning to retard the adverse effect of moisture and light on the said luminescent pigment.

7. A luminescent coating material comprising a resin, a solvent therefor, a luminescent pigment and a partial ester of a polyhydric alcohol and ricinoleic acid, said luminescent pigment being of a type adversely affected by moisture and light and the partial ester functioning to retard the adverse effect of moisture and light on the said luminescent pigment.

8. A luminescent coating material comprising a resin, a solvent therefor, a luminescent pigment and glycerol mono-ricinoleate, said luminescent pigment being of a type adversely affected by moisture and light.

9. A luminescent coating material comprising an alkyd resin, a solvent therefor, a luminescent pigment and glycerol mono-ricinoleate, said luminescent pigment being of a type adversely affected by moisture and light.

10. A luminescent coating material comprising a resin, a solvent therefor, a luminescent sulphide pigment and a partial ester of a mono-carboxylic acid containing at least 6 carbon atoms and a polyhydroxy substance.

11. A luminescent coating material comprising an alkyd resin, a solvent therefor, a luminescent sulphide pigment and a partial ester of a mono-carboxylic acid containing at least 6 carbon atoms and a polyhydroxy substance.

12. A luminescent coating material comprising an alkyd resin, a solvent therefor, a luminescent sulphide pigment and glycerol mono-ricinoleate.

13. A luminescent paint comprising a luminescent sulphide pigment, a binder therefor at least partially transparent to ultra violet light, a solvent for said binder and glycerol mono-ricinoleate, the glycerol mono-ricinoleate comprising 10% by weight based upon the weight of the pigment, and the pigment particles being coated therewith.

14. A luminescent coating material comprising a vehicle, a luminescent pigment, and a fatty acid mono-ester of an aliphatic polyhydric alcohol, the fatty acid radical of which contains at least 6 carbon atoms, said luminescent pigment being of a type affected adversely by moisture and light, said mono-ester functioning to retard the adverse effect of moisture and light on the luminescent pigment.

15. A luminescent coating material comprising an alkyd resin, a solvent therefor, a luminescent sulphide pigment and a fatty acid monoglyceride, the fatty acid radical of which contains at least 6 carbon atoms, said monoglyceride comprising of the order of about 10% by weight of the amount of said pigment.

SAMPSON ISENBERG.